United States Patent
Kortz et al.

(10) Patent No.: US 7,514,577 B2
(45) Date of Patent: Apr. 7, 2009

(54) PD- AND PT-SUBSTITUTED POLYOXOMETALATES AND PROCESS FOR THEIR PREPARATION

(75) Inventors: Ulrich Kortz, Bremen (DE); Lihua Bi, Changchun (CN)

(73) Assignee: ExxonMobil Chemical Patents Inc., Houston, TX (US)

( * ) Notice: Subject to any disclaimer, the term of this patent is extended or adjusted under 35 U.S.C. 154(b) by 303 days.

(21) Appl. No.: 11/445,073

(22) Filed: May 31, 2006

(65) Prior Publication Data

US 2007/0282139 A1     Dec. 6, 2007

(51) Int. Cl.
- *C07F 17/02* (2006.01)
- *C01G 41/02* (2006.01)
- *C07C 27/00* (2006.01)
- *B01J 23/00* (2006.01)

(52) U.S. Cl. .................. 556/28; 502/308; 502/313; 549/531; 549/533; 423/593.1; 423/594.13; 562/512.2; 562/545; 562/549; 534/11; 534/15; 568/959

(58) Field of Classification Search ............ 556/28; 502/308, 313; 549/531, 533; 423/593.1, 423/594.13; 562/512.2, 545, 549; 534/11, 534/15; 568/959
See application file for complete search history.

(56) References Cited

U.S. PATENT DOCUMENTS

| | | | |
|---|---|---|---|
| 4,196,136 A | 4/1980 | Knoth, Jr. | |
| 4,634,502 A | 1/1987 | Callahan et al. | |
| 4,839,008 A | 6/1989 | Hill | |
| 5,091,354 A | 2/1992 | Ellis, Jr. et al. | |
| 5,475,178 A | 12/1995 | Del Rossi et al. | |
| 5,616,815 A | 4/1997 | Atkins | |
| 5,629,459 A | 5/1997 | Atkins | |
| 5,684,216 A | 11/1997 | Haining | |
| 5,705,685 A | 1/1998 | Lyons et al. | |
| 5,714,429 A | 2/1998 | Haining | |
| 5,928,382 A | 7/1999 | Reinhardt et al. | |
| 6,022,986 A | 2/2000 | Scharbert et al. | |
| 6,043,184 A | 3/2000 | Karmakar et al. | |
| 6,060,419 A | 5/2000 | Wijesekera et al. | |

(Continued)

FOREIGN PATENT DOCUMENTS

EP     0 442 663     8/1991

(Continued)

OTHER PUBLICATIONS

Bi et al., First Structurally Characterized Palladium(II)-Substituted Polyoxoanion: Cs2Na(H2O)10Pd3( -SbIIIW9O33)2]9-, Inorganic Chemistry (2004), 43(13), 3915-3920.*

(Continued)

*Primary Examiner*—Sikarl A Witherspoon
*Assistant Examiner*—Chukwuma O Nwaonicha

(57) ABSTRACT

The invention relates to polyoxometalates represented by the formula $(A_n)^{m+}$ $[M_y(H_2O)_{(p.y)}X_2W_{22}O_{74}(OH)_2]^{m-}$ or solvates or mixtures thereof, wherein A represents a cation, n is the number of the cations, m is the charge of the polyoxoanion, M represents a transition metal selected from Pd, Pt and mixtures thereof, y is 1, 2, 3 or 4, p is the number of water molecules bound to one M and varies from 3 to 5, and X represents a heteroatom selected from $Sb^{III}$, $Bi^{III}$, $As^{III}$, $Se^{IV}$ and $Te^{IV}$, a process for their preparation and their use for the catalytic oxidation of organic molecules.

24 Claims, 1 Drawing Sheet

U.S. PATENT DOCUMENTS

| | | | |
|---|---|---|---|
| 6,114,274 | A | 9/2000 | Bordes et al. |
| 6,169,202 | B1 | 1/2001 | Wisesekera et al. |
| 6,229,028 | B1 | 5/2001 | Neumann et al. |
| 6,387,841 | B1 | 5/2002 | Devlin et al. |
| 6,455,735 | B1 | 9/2002 | Choudary et al. |
| 6,518,216 | B1 | 2/2003 | Han et al. |
| 6,610,864 | B2 * | 8/2003 | Krebs et al. ............. 549/531 |
| 6,664,408 | B2 | 12/2003 | Peng et al. |
| 6,673,733 | B2 | 1/2004 | Fukumoto et al. |
| 6,710,207 | B2 | 3/2004 | Bogan, Jr. et al. |
| 6,743,748 | B2 | 6/2004 | Mizuno et al. |
| 6,809,219 | B2 | 10/2004 | Han et al. |
| 7,019,165 | B2 | 3/2006 | Davis et al. |
| 7,097,858 | B2 | 8/2006 | Hill et al. |
| 7,358,380 | B2 | 4/2008 | Kortz et al. |
| 2002/0091275 | A1 | 7/2002 | Krebs et al. |
| 2002/0142914 | A1 | 10/2002 | Delvin et al. |
| 2002/0165405 | A1 | 11/2002 | Peng et al. |
| 2003/0017561 | A1 | 1/2003 | Lee et al. |
| 2003/0036473 | A1 | 2/2003 | Busch et al. |
| 2003/0109740 | A1 | 6/2003 | Gotz et al. |
| 2003/0144550 | A1 | 7/2003 | Davis et al. |
| 2003/0157012 | A1 | 8/2003 | Pope et al. |
| 2003/0171604 | A1 | 9/2003 | Mizuno et al. |
| 2003/0187297 | A1 | 10/2003 | Bogan, Jr. et al. |
| 2004/0185078 | A1 | 9/2004 | Hill et al. |
| 2004/0185116 | A1 | 9/2004 | Hill et al. |
| 2004/0210086 | A1 | 10/2004 | Bogan, Jr. et al. |
| 2005/0112055 | A1 | 5/2005 | Shannon et al. |
| 2006/0142620 | A1 | 6/2006 | Deshpande et al. |
| 2007/0027339 | A1 | 2/2007 | Fullerton |
| 2007/0093379 | A1 | 4/2007 | Busch et al. |
| 2007/0282138 | A1 | 12/2007 | Richards et al. |
| 2008/0177118 | A1 | 7/2008 | Kortz et al. |

FOREIGN PATENT DOCUMENTS

| | | |
|---|---|---|
| EP | 0 955 284 | 11/1999 |
| EP | 1 059 276 | 12/2000 |
| EP | 1 077 082 | 2/2001 |
| EP | 1 078 687 | 2/2001 |
| EP | 1 080 784 | 3/2001 |
| EP | 1 201 636 | 5/2002 |
| EP | 1 213 280 | 6/2002 |
| JP | 3349996 | 9/2002 |
| WO | WO 00/09262 | 2/2000 |
| WO | WO 03/028881 | 4/2003 |

OTHER PUBLICATIONS

Bi et al., The palladium(II)-substituted, lone pair containing tungstoarsenates(III) [Na2(H2O)2PdWO(H2O)( -AsW9O33)2]10- and [Cs2Na(H2O)8Pd3( -AsW9O33)2]-, European Journal of Inorganic Chemistry (2005), (15), 3034-3041.*

Jin et al., Syntheses and characterization of the noble-metal substituted heptadecatungstodiarsenates, Chinese Journal of Chemistry (1997), 15(3), 234-241.*

Contant, et al., "Potassium Lithium Octatetracontatungsto-Octaphosphate, $K_{28}Li_5H_7(P_8W_{48}O_{184})\cdot 92H_2O$ $4[H_2P_2W_{12}O_{48}]^{12-}+15H_3O^+ \rightarrow [H_7P_8W_{48}O_{184}]^{33-}+23H_2O$", Inorg. Synth., 1990, vol. 27, pp. 110-111.

Adam et al., "A Highly Chemoselective, Diastereoselective, and Regioselective Epoxidation of Chiral Allylic Alcohols with Hydrogen Peroxide, Catalyzed by Sandwich-Type Polyoxometalates: Enhancement of Reactivity and Control of Selectivity by the Hydroxy Group through Metal-Alcoholate Bonding", J. of Org. Chem., 2003, vol. 68, No. 5, pp. 1721-1728.

Alam, et al., "STM/STS Observation of Polyoxoanions on HOPG Surfaces: the Wheel-Shaped $[Cu_{20}Cl(OH)_{24}(H_2O)_{12}(P_8W_{48}O_{184})]^{25-}$ and the Ball-Shaped $[\{Sn(CH_3)_2(H_2O)\}_{24}\{Sn(CH_3)_2\}_{12}(A-PW_9O_{34})_{34}]^{36-}$", Inorg. Chem., 2006, vol. 45, No. 7, pp. 2866-2872.

Bi, et al., "First Structurally Characterized Palladium(II)-Substituted Polyoxoanion: $[Cs_2Na(H_2O)_{10}Pd_3(\alpha\text{-}Sb^{III}W_9O_{33})_2]^{9-}$", Inorg. Chem., 2004, vol. 43, No. 13, pp. 3915-3920.

Bi, et al., "Synthesis and Structure of the Pentacopper(II) Substituted Tungstosilicate $[Cu_5(OH)_4(H_2O)_2(A\text{-}\alpha\text{-}SiW_9O_{33})_2]^{10-}$", Inorg. Chem., 2004, vol. 43, No. 25 pp. 7961-7962.

Bösing, et al., "Highly Efficient Catalysts in Directed Oxygen-Transfer Processes: Synthesis, Structure of Novel Manganese-Containing Heteropolyanions, and Applications in Regioselective Epoxidation of Dienes with Hydrogen Peroxide", J. Am. Chem. Soc., vol. 120, No. 29, 1998, pp. 7252-7259.

Cavani, et al., "Combined effects of Sb-doping and preparation via lacunary precursor for P/Mo-based, Keggin-type poloxometalates, catalysts for the selective oxidation of isobutane to methacrylic acid, Topics in Catalysis", 2003, vol. 23, Nos. 1-4, pp. 119-124.

Cavani, et al., "Improvement of catalytic performance in isobutane oxidation to methacrylic acid of Keggin-type phosphomolybdates by preparation via lacunary precursors: nature of the active sites", Catalysis Letters, 2001, vol. 75, No. 1-2, pp. 99-105.

Choi, et al., "Observation of a Half Step Magnetization in the $\{Cu_3\}$-Type Triangular Spin Ring", Physical Review Letters, 2006, PRL 96, pp. 107202-1-107202-4.

Contant, et al., "A New Crown Heteropolyanion $K_{28}Li_5H_7P_8W_{48}O_{184}\cdot 92H_2O$: Synthesis, Structure, and Properties", Inorg. Chem., 1985, vol. 24, No. 26, pp. 4610-4614.

Contant, et al., "Potassium Lithium Octatetracontatungsto-Octaphospahte, $K_{28}Li_5H_7(P_8W_{48}O_{184})\cdot 92H_2O$ $4[H_2P_2W_{12}O_{48}]^{12-}+15H_3O^+ \rightarrow [H_7P_8W_{48}O_{184}]^{33-}+23H_2O$", Inorg. Synth., 1990, vol. 27, pp. 110-111.

Godin, et al., "Coordination Chemistry of the Hexavacant Tungstophosphate $(H_2P_2W_{12}O_{48})^{12-}$ with $Fe^{III}$ Ions: Towards Original Structures of Increasing Size and Complexity", Angew. Chem., Int. Ed., 2005, vol. 44, pp. 3072-3075.

Haber, et al., "Catalytic performance of the dodecatungstophosphoric acid on different supports", Applied Catalysis A: General 256, 2003, pp. 141-152.

Hu, et al., "Homogeneous-phase catalytic $H_2O_2$ oxidation of isobutyraldehyde using Keggin, Dawson and transition metal-substituted lacunary heteropolyanions", Journal of Molecular Catalysis A: Chemical, 2002, vol. 184, pp. 451-464.

Hussain, et al., "Tetrakis(dimethyltin)-Containing Tungstophosphate $[\{(Sn(CH_3)_2\}_4(H_2P_4W_{24}O_{92})_2]^{28-}$: First Evidence for a Lacunary Preyssler Ion", Inorg. Chem., 1985, vol. 45, No. 2, pp. 761-766.

Jabbour, et al., "The wheel-shaped Cu20-tungstophosphate $[Cu_{20}Cl(OH)_{24}(H_2O)_{12}(P_8W_{48}O_{184})]^{25-}$, redox and electrocatalytic properties", Electrochemistry Communications, 2005, vol. 7, pp. 841-847.

Kamata, et al., "Efficient Epoxidation of Olefins with ≧99% Selectivity and Use of Hydrogen Peroxide", Science, 2003, vol. 300, pp. 964-966.

Kortz, et al., "Synthesis and Characterization of Copper-, Zinc-, Manganese-, and Cobalt-Substituted Dimeric Heteropolyanions, $[(\alpha\text{-}XW_9O_{33})_2M_3(H_2O)_3]^{n-}$ ($n=12$, $X=As^{III}$, $Sb^{III}$, $M=Cu^{2+}$, $Zn^{2+}$; $n=10$, $X=Se^{IV}$, $Te^{IV}$, $M=Cu^{2+}$) and $[(\alpha\text{-}AsW_9O_{33})_2WO(H_2O)M_2(H_2O)_2]^{10-}$ ($M=Zn^{2+}$, $Mn^{2+}$, $CO^{2+}$)", Inorg. Chem., 2001, vol. 40, No. 18, pp. 4742-4749.

Kortz, et al., "Sandwich-Type Germanotungstates: Structure and Magnetic Properties of the Dimeric Polyoxoanions $[M_4(H_2O)_2(GeW_9O_{34})_2]^{12-}$ ($M=Mn^{2+}$, $Cu^{2+}$, $Zn^{2+}$, $Cd^{2+}$)", Inorg. Chem., 2004, vol. 43, No. 7, pp. 2308-2317.

Kortz, et al., "Sandwich-Type Silicotungstates: Structure and Magnetic Properties of the Dimeric Polyoxoanions $[\{SiM_2W_9O_{34}(H_2O)\}_2]^{12-}$ ($M=Mn^{2+}$, $Cu^{2+}$, $Zn^{2+}$)", Inorg. Chem., 2000, vol. 39, No. 13, pp. 2915-2922.

Kortz, et al., "Structure and Magnetism of the Tetra-Copper(II)-Substituted Heteropolyanion $[Cu_4K_2(H_2O)_8(\alpha\text{-}AsW_9O_{33})_2]^{8-}$", Inorg. Chem., 2004, vol. 43, No. 1, pp. 144-154.

Kortz, et al., "Synthesis and Characterization of Iron(III)-Substituted, Dimeric Polyoxotungstates, $[Fe_4(H_2O)_{10}(\beta\text{-}XW_9O_{33})_2]^{n-}$ ($n=6$, $X=As^{III}$, $SB^{III}$; $n=4$, $X=Se^{IV}$, $Te^{IV}$)", Inorg. Chem., 2002, vol. 41, No. 4, pp. 783-789.

Krebs, et al., "Syntheses and Crystal Structure Studies of Novel Selenium- and Tellurium-Substituted Lacunary Polyoxometalates", Polyoxometalate Chemistry, 2001, pp. 89-99.

Kuznestsova, et al., "$O_2/H_2$ Oxidation of Hydrocarbons on the Catalysts Prepared from Pd (II) Complexes with Heteropolytungstates", 3rd World Congress on Oxidation Catalysis, Elsevier Science B.V., 1997, pp. 1203-1211.

Li, et al., "Lacunary Keggin Polyoxotungstate as Reaction-controlled Phase-transfer Catalyst for Catalytic Epoxidation of Olefins", Chinese Journal of Chemistry, 2004, vol. 22, No. 8, pp. 874-876.

Liu, et al., "Wheel-Shaped Polyoxotungstate $[Cu_{20}Ci(OH)_{24}(H_2O)_{12}(P_8W_{48}O_{184})]^{25-}$, Macroanions Form Supramolecular "Blackberry" Structure in Aqueous Solution", J. Am. Chem. Soc., 2006, vol. 128, No. 31, pp. 10103-10110.

Loose, et al., "Heteropolymetalate Clusters of the Subvalent Main Group Elements $Bi^{III}$ and $SB^{III}$", Inorg. Chem., 1999, vol. 38, No. 11, pp. 2688-2694.

Mal, et al., "The Wheel-Shaped $Cu_{20}$ Tungstophosphate $(Cu_{20}Cl)(OH)_{24}(H_2O)_{12}(P_8W_{48}O_{18\ 4})^{25-}$ Ion", Angew. Chem. Int. Ed., 2005, vol. 44, pp. 3777-3780.

Mizuno, et al., "Heterogeneous Catalysis", Chem. Rev., 1998, vol. 98, No. 1, pp. 199-217.

Neumann, et al, "Hydroxylation of Alkanes with Molecular Oxygen Catalyzed by a New Ruthenium-Substituted Polyoxometalate, $[WZnRu_2^{III}(OH)(H_2O)(ZnW_9O_{34})_2]^{11-}$", Angew. Chem. Int. Ed. Engl., 1995, vol. 34, No. 15, pp. 1587-1589.

Neumann, et al., "Noble Metal ($Ru^{III}$, $Pd^{II}$, $Pt^{II}$) Substituted "Sandwich" Type Polyoxometalates: Preparation, Characterization, and Catalytic Activity in Oxidations of Alkenes and Alkenes by Peroxides", Inorg. Chem., 1995, vol. 34, No. 23, pp. 5753-5760.

Neumann, et al., "Molecular Oxygen Activation by a Ruthenium-Substituted "Sandwich" Type Poloxometalate", J. Am. Chem. Soc., 1998, vol. 120, No. 46, pp. 11969-11976.

Okun, et al., "$[(Fe^{III}(OH_2)_2)_3(A-\alpha-PW_9O_{34})_2]^{9-}$ on Cationic Silica Nanoparticles, a New Type of Material and Efficient Heterogeneous Catalyst for Aerobic Oxidations", J. of Am. Chem. Soc., 2003, vol. 125, No. 11, pp. 3194-3195.

Ratiu, et al., "Synthesis and characterization of $K_6[Ti(H_2O)P_2MoW_{16}O_{61}]\cdot 17H_2O$, a Ti(IV) derivative of monolacunary Wells-Dawson 16-tungsto-molybdo-2-phosphate", Polyhedron, 2002, vol. 21, pp. 353-358.

Rong, et al., "Lacunary Polyoxometalate Anions Are π-Acceptor Ligands. Characterization of Some Tungstoruthenate(II,III,IV,V) Heteropolyanions and Their Atom-Transfer Reactivity", J. Am. Chem. Soc., 1992, vol. 114, No. 8, pp. 2932-2938.

Rusu, et al., "FT-IR, UV-VIS and EPR investigations of multicopper polyoxotungstates will $Bi^{III}$ as heteroatom", Journal of Molecular Structure 563-564, 2001, pp. 427-433.

Rusu, et al., "Spectroscopic and electron paramagnetic resonance behavior of trinuclear metallic clusters encapsulated in $[M^{n+}_3(H_2O)_{x-}(BiW_9O_{33})_2]^{18-(3n)-}$ heteropolyanions ($M^{n+}=(VO)^{II}$, x=0 and $M^{n+}=Cr^{III}$, $Mn^{II}$, $Fe^{III}$, $Co^{II}$, $Ni^{II}$, $Cu^{II}$, x=3)", J. Chem. Soc., Dalton Trans., 2001, pp. 2879-2887.

Server-Carrio, et al., "Synthesis Characterization, and Catalysis of $\beta_3-[(Co^{II}O_4)W_{11}O_{31}(O_2)_4]^{10-}$ the First Keggin-Based True Heteropoly Dioxygen (Peroxo) Anion. Depctroscopic (ESR, IR) Evidence for the Formation of Superoxo Polytungstates", J. Am. Chem. Soc., 1999, vol. 121, No. 5, pp. 977-984.

Sousa, et al., "Novel cerium (IV) heteropolyoxtungstate containing two types of lacunary Keggin anions", Chem. Comm., 2004, pp. 2656-2657.

Stowe, et al., "Magnetic Properties of Lone-Pair-Containing, Sandwich-Type Polyoxoanions: A Detailed Study of the Heteroatomic Effect", Eur. J. Inorg. Chem., 2004, pp. 3792-3797.

Villanneau, et al., "Co-ordination chemistry of lacunary Lindqvist-type polyoxometalates:cubic vs. square-antiprismatic co-ordination", J. Chem. Soc., Dalton Trans., 1999, pp. 421-426.

Yamase et al., "Ferromagnetic Exchange Interactions for $Cu_6^{12+}$ and $Mn_6^{12+}$ Hexagons Sandwiched by Two $B-\alpha-[XW_9O_{33}]^{9-}$ ($X=As^{III}$ and $Sb^{III}$) Ligands in $D_{3d}$-Symmetric Polyoxotungstates", Inorg. Chem., 2006, vol. 45, No. 19, pp. 7698-7704.

Yin, et al., "Autoxidation-Product-Initated Dioxygenases:Vanadium-Based, Record Catalytic Lifetime Catechol Dioxgenase Catalysis", Inorg. Chem., 2005, vol. 44, No. 23, pp. 8521-8530.

Zimmermann, et al., "New Lanthanide-Containing Polytungstates Derived from the Cyclic $P_8W_{48}$ Anion: $\{Ln_4(H_2O)_{28}(K \subset P_8W_{48}O_{184}(H_4W_4O_{12})\ _2Ln_2\ (H_2O)_{10}]^{13-}\}_x$, Ln=La, Ce, Pr, Nd", Inorg. Chem., 2007, vol. 46, No. 5, pp. 1737-1740.

U.S. Appl. No. 11/728,142, entitled "Novel Transition Metal Substituted Polyoxometalates and Process For Their Preparation", Kortz et al., filed Mar. 23, 2007.

U.S. Appl. No. 12/037,647, entitled "Novel Heteropolyanions With Late Transition Metal Addenda Atoms and Process For Their Preparation", Chubarova et al., filed Feb. 26, 2008.

U.S. Appl. No. 12/143,628, entitled "Novel Ru-Containing Polyoxotungstates and Process For Their Preparation", Kortz et al., filed Jun. 20, 2008.

Anderson et al., "A Palladium-Oxo Complex. Stabilization of this Proposed Catalytic Intermediate by an Encapsulating Polytungstate Ligand," J. Am. Chem. Soc., vol. 127, 2005, pp. 11948-11949.

Angus-Dunne et al., "A Novel Heteropolymetalate Containing Palladium(II): Synthesis and Crystal Structure of K2Na6[Pd2W10O36] 22H2O," J. Chem. Soc., Chem. Commun. 1994, 523-524.

Bi, L-H et al., "Palladium (II)-Substituted Tungstosilicate [Cs2K(H2O)7Pd2WO(H2O)(A-α-SiW9O34)2]9-," Inorganic Chemistry, vol. 43, No. 26, 2004, pp. 8367-8372, XP002416117.

Bi, L-H et al., "The Palladium (II)-Substituted Lone Pair Containing Tungstoarsenates(III) [Na2(H2O)2PdWO(H2O)(α-AsW9O33)2]10- and [Cs2Na(H2O)8Pd3(α-AsW9O33)2]9-," Eur. J. Inorg. Chem. 2005, pp. 3034-3041, XP002416116.

Bösing, M. et al., "New Strategies for the Generation of Large Heteropolymetalate Clusters: the beta-B-SbW9 Fragments as Multifunctional Unit," Chem. Eur. J., vol. 3, No. 8, 1997, pp. 1232-1237, XP003412881.

Cavani, F., "Heteropolycompound-based catalysts: A blend of acid and oxidizing properties," Catalysis Today 41 (1998) 73-86.

Hill et al., "A Late-Transition Metal Oxo Complex: $K_2Na_9[O=Pt^{IV}(H_2O)L_2]$, $L=[PW_9O_{34}]^{9-}$," Science 2004, vol. 306, 2074-2077.

Knoth, "Derivatives of Heteropolyanions. 2. Metal-Metal-Bonded Derivatives," J. Am. Chem. Soc., vol. 101, No. 8, 1979, pp. 2211-2212, XP002416115.

Kortz et al., "First Structurally Characterized Palladium(II)-Substituted Polyoxoanion: $[Cs_2Na(H_2O)_{10}Pd_3(\alpha-Sb^{III}W_9O_{33})_2]^{9-}$," Inorg. Chem. 2004, 43, 3915-3920.

Krebs et al., "Synthesis and Structural Chemistry of Novel Heteropolymolybdates and Tungstates," Molecular Engineering, Dordrecht, NL, vol. 3, No. 1-3, 1993, pp. 43-59, XP008073135.

Lee et al., "Synchroton structure determination of an α-Keggin doubly PtIV-substituted silicotungstate, (CH6N3)8[α-SiPt2-W 10O40]-6H2O," Acta Crystallographica, Section C, 2003, C59, m152-m1555.

Lee et al., "Dipotassium Hexahydrogen-α-hexamolybdoplatinate(IV) Pentahydrate, K2[H6α-PtMo6O24]. 5H2O," Acta Crystallographica 1994, C50, 1657-1659.

Lee et al., "Anhydrous octaguanidinium hexatungstoplatinate(IV)," Acta Crystallographica 2003, E59, m116-m118.

Lee et al., "The Geometrical Isomerization on Acidification in Hexamolydoheteropoly Oxometalate. The Crystal Structure of (NH4)4.5[H3.5α-PtMo6O24]. 1.5H2O, (NH4)4[H4β-PtMo6O24]. 1.5H2O, and K3.5[H4.5α-PtMo6O24]. 3H2O," Bulletin of the Korean Chemical Society, 1994, vol. 15, No. 1, 37-45.

Misono, M., "Unique acid catalysis of heteropoly compounds (heteropolyoxometalates) in the solid state," Chem. Comm., 2001, 1141-1152.

Misono et al., "Recent progress in catalytic technology in Japan," Applied Catalysis, vol. 64 (1-2), Sep. 1990.

* cited by examiner

PD- AND PT-SUBSTITUTED POLYOXOMETALATES AND PROCESS FOR THEIR PREPARATION

FIELD OF THE INVENTION

This invention relates to new palladium- and platinum-substituted polyoxymetalates, a process for their preparation and their use for the catalytic oxidation of organic molecules.

BACKGROUND OF THE INVENTION

Polyoxometalates (POMs) are a unique class of inorganic metal-oxygen clusters. They consist of a polyhedral cage structure or framework bearing a negative charge which is balanced by cations that are external to the cage, and may also contain centrally located heteroatom(s) surrounded by the cage framework. Generally, suitable heteroatoms include Group IIIa-VIa elements such as phosphorus, antimony, silicon and boron. The framework of polyoxometalates comprises a plurality of metal atoms (addenda), which can be the same or different, bonded to oxygen atoms. Due to appropriate cation radius and good π-electron acceptor properties, the framework metal is substantially limited to a few elements including tungsten, molybdenum, vanadium, niobium and tantalum.

In the past, there have been increasing efforts towards the modification of polyoxoanions with various organic and/or transition metal complex moieties with the aim of generating new catalyst systems as well as functional materials with interesting optical, electronic and magnetic properties. In particular, transition metal substituted polyoxometalates (TMSPs) have attracted continuously growing attention as they can be rationally modified on the molecular level including size, shape, charge density, acidity, redox states, stability, solubility, etc.

For example, Angus-Dunne et al. describe the preparation of palladium-susutituted sanwich-type polyxometalate $K_2Na_6[Pd_2W_{10}O_{36}] \cdot 22H_2O$ (see: J. Chem. Soc., Chem. Commun. 1994, 523-524). This polyanion is composed of two $W_5O_{18}^{6-}$ moieties linked by two palladium(II) ions in square-planar environments.

Lee et al. disclose the structure of several platinum(IV)-substituted polyoxometalates, such as $(CH_6N_3)_8[\alpha\text{-}SiPt_2W_{10}O_{40}] \cdot 6H_2O$, a Keggin-type polyanion in which two addenda atoms are replaced by Pt atoms (Acta Crystallographica, Section C, 2003, C59, m152-m155), as well as $K_2[H_6\text{-}\alpha\text{-}PtMo_6O_{24}] \cdot 5H_2O$ (Acta Crystallographica, Section C, 1994, C50, 1657-1659), $(CH_6N_3)_8[PtW_6O_{24}]$ (Acta Crystallographica, Section E, 2003, E59, m116-m118), $(NH_4)_{4.5}[H_{3.5}\text{-}\alpha\text{-}PtMo_6O_{24}] \cdot 1.5H_2O$, $(NH_4)_4[H_4\text{-}\beta\text{-}PtMo_6O_{24}] \cdot 1.5H_2O$ and $K_{3.5}[H_{4.5}\text{-}\alpha\text{-}PtMo_6O_{24}] \cdot 3H_2O$ (Bulletin of the Korean Chemical Society 15, 1994, 37-45), which all have the so-called Anderson structure.

Kortz et al. report on the palladium(II)-substituted, dimeric, lone pair containing polyanion $[Cs_2Na(H_2O)_{10}Pd_3(\alpha\text{-}SbW_9O_{33})_2]^{9-}$ (Inorg. Chem. 2004, 43, 3915-3920). This polyanion was synthesized by reacting $Pd(CH_3COO)_2$ with $[\alpha\text{-}SbW_9O_{33}]^{9-}$ in aqueous acidic medium. The square-planar palladium(II) ions are located in the central belt of the sandwich-type structure connecting two $(\alpha\text{-}SbW_9O_{33})$ Keggin moieties via bonding to oxygen atoms of the $WO_6$ octahedra.

Hill et al., Science 2004, 306, 2074-2077, disclose the synthesis of the Pt(IV)-containing compound $K_7Na_9[Pt(O)(H_2O)(PW_9O_{34})_2] \cdot 21.5 H_2O$. The polyanion $[Pt(O)(H_2O)(PW_9O_{34})_2]^{16-}$ is composed of two (A-α-$PW_9O_{34}$) Keggin units linked by an octahedral platinum(IV) center with terminal oxo and water ligands. Attempts to prepare the palladium (IV) analogue of this complex proved unsuccessful.

Kortz et al., Inorg. Chem. 2004, 43, 8367-8372, describe the synthesis of a palladium(II)-substituted tungstosilicate, $[Cs_2K(H_2O)_7Pd_2WO(H_2O)(A\text{-}\alpha\text{-}SiW_9O_{34})_2]^{9-}$. This polyanion was synthesized by reacting $Pd(CH_3COO)_2$ with $[A\text{-}\alpha\text{-}SiW_9O_{34}]^{10-}$ in aqueous acidic medium. It is composed of two $(A\text{-}\alpha\text{-}SiW_9O_{34})$ Keggin moieties which are linked via a central belt consisting of a $\{WO(H_2O)\}^{4+}$ group, two Pd(II) centers, one potassium ion and two cesium ions. The palladium(II) ions exhibit square-planar coordination geometry as they are only ligated to four oxo groups of the polyanion backbone. The potassium and cesium ions are also coordinated by terminal water molecules.

Moreover, Kortz et al. report on the palladium(II)-substituted, lone pair containing polyanion $[Cs_2Na(H_2O)_8Pd_3(\alpha\text{-}AsW_9O_{33})_2]^{9-}$ (Eur. J. Inorg. Chem. 2005, 3034-3041). This polyanion was synthesized by reacting $PdCl_2$ with $[\alpha\text{-}AsW_9O_{33}]^{9-}$ in aqueous acidic medium. The square-planar palladium(II) ions are located in the central belt of the sandwich-type structure connecting two $(\alpha\text{-}AsW_9O_{33})$ Keggin moieties via bonding to oxygen atoms of the $WO_6$ octahedra. This polyanion can be considered as the As-analogue of the above mentioned $[Cs_2Na(H_2O)_{10}Pd_3(\alpha\text{-}SbW_9O_{33})_2]^{9-}$.

Kortz et al. also report on the palladium(II)-substituted, lone pair containing polyanion $[Na_2(H_2O)_2PdWO(H_2O)(\alpha\text{-}AsW_9O_{33})_2]^{10-}$ (Eur. J. Inorg. Chem. 2005, 3034-3041). This polyanion was synthesized by reacting $PdCl_2$ with $[AS_2W_{19}O_{67}(H_2O)]^{14-}$ in aqueous acidic medium. It is composed of two $(\alpha\text{-}AsW_9O_{33})$ Keggin moieties which are linked via a central belt consisting of a $\{WO(H_2O)\}^{4+}$ group, a square-planar Pd(II) center and two sodium ions. One of the two sodium ions in the central belt is located in an addenda atom position, which appears to decrease the stability of this polyanion in solution.

Recently, Hill et al. describe the preparation of a Pd(IV)-oxo compound, $K_{10}Na_3[Pd^{IV}(O)(OH)WO(OH_2)(PW_9O_{34})_2]$, by reacting $PdSO_4$ with $[A\text{-}\alpha\text{-}PW_9O_{34}]^{9-}$ yielding $[Pd^{II}_3(PW_9O_{34})_2]^{12-}$ which undergoes rapid loss of Pd(II) to form $[Pd^{II}WO(OH_2)(PW_9O_{34})_2]^{12-}$ and oxidation of this compound resulted in the Pd(IV)-oxo complex (Hill et al., J. Am. Chem. Soc. 2005, 127, 11948-11949). This polyanion is composed of two (A-α-$PW_9O_{34}$) Keggin moieties which are linked via a central belt consisting of a $\{WO(H_2O)\}^{4+}$ group and a $\{PdO(OH)\}^+$ group. The tungsten center in the belt has an internal oxo ligand and an external water ligand, whereas the Pd center has an internal oxo and an external hydroxy ligand.

However, up to now the known Pd— and Pt-based anions have not turned out to be very useful for homogeneous or heterogeneous catalytic applications.

Therefore, it is an object of the present invention to provide palladium- and/or platinum-substituted polyoxometalates which are useful as catalyst in homogeneous and heterogeneous oxidation reactions of organic substrates. Furthermore, such Pd— and/or Pt-substituted POMs should be easy and reproducible to prepare.

SUMMARY OF THE INVENTION

This invention relates to Polyoxometalate represented by the formula

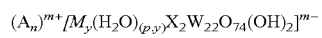

or solvates or mixtures thereof, wherein
A represents a cation,
n is the number of the cations,
m is the charge of the polyoxoanion,
M represents a transition metal selected from Pd, Pt and mixtures thereof,
y is 1, 2, 3 or 4,
p is the number of water molecules bound to one M and varies from 3 to 5, and
X represents a heteroatom selected from $Sb^{III}$, $Bi^{III}$, $As^{III}$, $Se^{IV}$ and $Te^{IV}$.

DETAILED DESCRIPTION OF THE INVENTION

Figure 1:
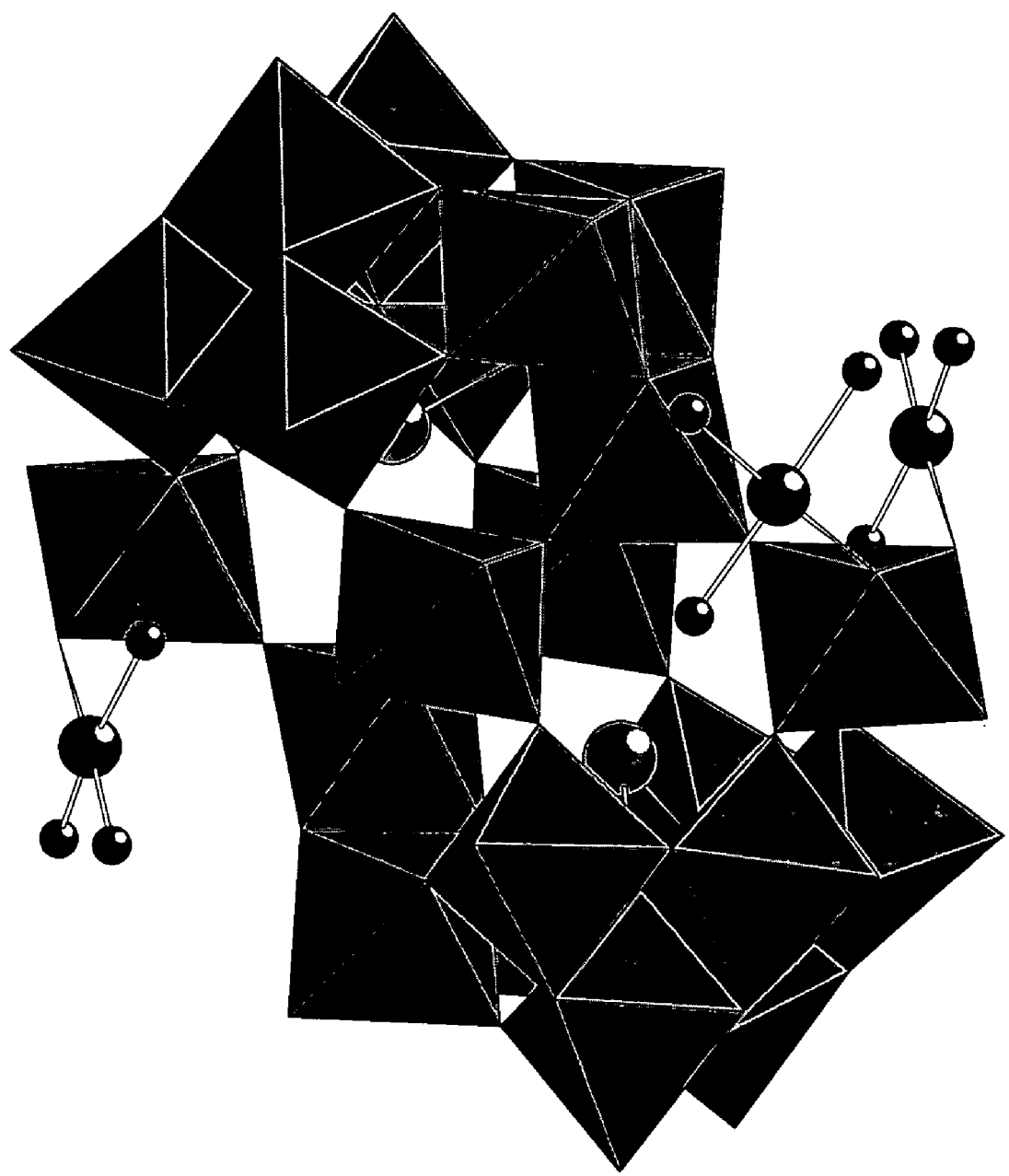
FIG. 1 is an illustration of the material produced in example 1.

The CAS numbering scheme for the Periodic Table Groups is used as published in CHEMICAL AND ENGINEERING NEWS, 63(5), 27 (1985).

The objects described above are achieved by polyoxometalates represented by the formula

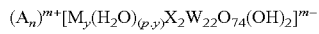

or solvates or mixtures thereof, wherein
A represents a cation,
n is the number of the cations,
m is the charge of the polyoxoanion,
M represents a transition metal selected from Pd, Pt and mixtures thereof,
y is 1, 2, 3 or 4,
p is the number of water molecules bound to one M and varies from 3 to 5, and
X represents a heteroatom selected from $Sb^{III}$, $Bi^{III}$, $As^{III}$, $Se^{IV}$ and $Te^{IV}$.

The number p of water molecules bound to one transition metal M varies from 3 to 5 and generally depends on the oxidation state of M which in turn can range from (II) to (IV).

Preferably, p is 3 and the oxidation state of M is (II). Alternatively, p is 5 and the oxidation state of M is (IV).

Accordingly, in a preferred embodiment, the invention relates to polyoxometalates represented by the formula

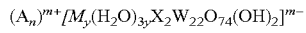

or solvates or mixtures thereof, wherein
A represents a cation,
n is the number of the cations,
m is the charge of the polyoxoanion,
M represents a transition metal selected from Pd, Pt and mixtures thereof,
y is 1, 2, 3 or 4, and
X represents a heteroatom selected from $Sb^{III}$, $Bi^{III}$, $As^{III}$, $Se^{IV}$ and $Te^{IV}$.

The polyanion $[M_y(H_2O)_{(p.y)}X_2W_{22}O_{74}(OH)_2]^{m-}$ of the polyoxometalates according to the invention has been found to exist in a Krebs-type structure, i.e. it is a dimeric POM consisting of two trilacunary Keggin fragments B-β-$[XW_9O_{33}]^{p-}$ that are connected by two $\{WO_2\}^{2+}$ cations and two $\{WO_2(OH)\}^+$ groups.

In the solid state structure the transition metal centers are weakly coordinated via only one Pd—O—W or Pt—O—W bond to the polyanion framework. More precisely, the Pd— and/or Pt-centers are coordinated to the $\{WO_2(OH)\}^+$ linking groups of the Krebs-type polyanion. Consequently, the Pd— and/or Pt-ions are not fully incorporated in the polyanion structure, but rather have an external, highly accessible position. In case the oxidation state of the transition metal M is (II), the remaining three coordination sites of the square-planar palladium and/or platinum centers are occupied by terminal water ligands. Thus, the present polyoxometalates comprise palladium and/or platinum ions having three terminal substitution labile ligands. The structure of a polyanion according to the invention bearing 3 transition metals M(II) is also illustrated in FIG. 1. In case the oxidation state of M is (IV), each palladium and/or platinum center has an octahedral coordination sphere and thus the remaining five coordination sites are occupied by terminal water ligands.

As water ligands can easily be substituted, the polyoxometalates of the invention allow an easy generation of free coordination sites at the catalytically active transition metal. Moreover, the palladium and platinum ions are not sterically shielded by the POM structure. Consequently, the palladium and platinum centers are readily accessible for other ligands including organic substrates and oxygen donor species such as $O_2$, $H_2O_2$, organic peroxides (e.g. t-$(C_4H_9)$OOH) or peracids (e.g. $CH_3$COOH) which improves the catalytic performance in oxidation reactions.

The cation A can be a Group Ia, IIa, IIIb, IVb, Vb, VIb, VIIb, VIIIb, Ib, IIb, IIIa, IVa, Va and VIa metal or an organic cation. Preferably, A is selected from the group consisting of lithium, sodium, potassium, rubidium, cesium, magnesium, calcium, strontium, barium, titanium, vanadium, chromium, lanthanum, lanthanide metal, actinide metal, manganese, iron, cobalt, nickel, copper, zinc, ruthenium, palladium, platinum, tin, antimony, tellurium, phosphonium such as tetraalkylphosphonium, ammonium, guanidinium, tetraalkylammonium, protonated aliphatic amines, protonated aromatic amines or combinations thereof. More preferably, A is selected from sodium, palladium, potassium and combinations thereof.

The number n of cations is dependent on the nature of cation(s) A, namely its/their valence, and the negative charge m of the polyanion which has to be balanced. In any case, the overall charge of all cations A is equal to the charge of the polyanion. In turn, the charge m of the polyanion is dependent on the oxidation state of the heteroatom X as well as the oxidation state and the number of the transition metals M. m depends on the oxidation state of the atoms present in the polyanion, e.g., it follows from the oxidation states of W (+6), O (−2), a given heteroatom X (such as +3 for Sb, Bi and As or +4 for Se and Te), and Pd and/or Pt (ranging from +2 to +4). In some embodiments, m is 2, 4, 6, 8, or 10. In some embodiments, n is 1, 2, 3, 4, 5, 6, 7, 8, 9, or 10. In a preferred embodiment m is 6. In a preferred embodiment m is 8.

In particular, palladium and preferably palladium(II) is used as transition metal M.

The number y of the transition metals M bound to the Krebs-type polyoxometalate can generally range from 1 to 4 and in particular is 3 in a given molecule. Based on all POM molecules of a given sample, average y values ranging from 2 to 3 such as about 2.6 and preferably 3 can be obtained.

The heteroatom X of the polyoxometallates according to the invention is advantageously selected from $Bi^{III}$ and $Sb^{III}$ and is preferably $Bi^{III}$.

Accordingly, suitable examples of polyoxometalates according to the invention are represented by the formula

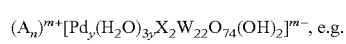

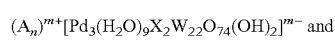

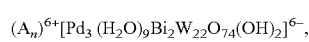

where A, n, m, y, X, are as described above.

The invention also includes solvates of the present POMs. A solvate is an association of solvent molecules with a polyoxometalate. Preferably, water is associated with the POMs and thus, the POMs according to the invention can in particular be represented by the formula $$(A_n)^{m+}[M_y(H_2O)_{(p \cdot y)}X_2W_{22}O_{74}(OH)_2]^{m-} \cdot zH_2O, \text{ such as}$$

$$(A_n)^{m+}[M_y(H_2O)_{3y}X_2W_{22}O_{74}(OH)_2]^{m-} \cdot zH_2O,$$

where A, n, M, m, y, X, are as described above, and wherein z represents the number of attracted water molecules per POM molecule, exclusive of the water molecules which are bound as ligands to palladium or platinum. In an embodiment z is an integer from 1 to 50. In some embodiments, z is 2, 4, 5, 6, 8, 10, 12, 16, 18, 20, 22, 24, 25, 26, or 30.

Suitable examples of the polyoxometalate solvates according to the invention are represented by the formulae $$(A_n)^{m+}[Pd_y(H_2O)_{3y}X_2W_{22}O_{74}(OH)_2]^{m-} \cdot zH_2O, \text{ e.g.}$$

$$(A_n)^{m+}[Pd_3(H_2O)_9X_2W_{22}O_{74}(OH)_2]^{m-} \cdot zH_2O,$$

$$(A_n)^{6+}[Pd_3(H_2O)_9Bi_2W_{22}O_{74}(OH)_2]^{6-} \cdot zH_2O, \text{ and}$$

$$Na_3Pd_{1.5}[Pd_3(H_2O)_9Bi_2W_{22}O_{74}(OH)_2] \cdot 22H_2O,$$

where A, n, m, y, X, and z are as described above. The invention is further directed to a process for preparing polyoxometalates according to the invention comprising (a) reacting an aqueous solution of a source of M with
   (i) a salt of $[X_2W_{22}O_{74}(OH)_2]^{w-}$,
   (ii) a salt of $(XW_9O_{33})^{y-}$ and a salt of $WO_4^{2-}$ or
   (iii) an X containing starting material and a salt of $WO_4^{2-}$
to form a salt of $[M_y(H_2O)_{(p \cdot y)}X_2W_{22}O_{74}(OH)_2]^{m-}$, (b) optionally cooling and filtering the reaction mixture of step (a), (c) optionally adding a salt of A to the reaction mixture of step (a) or the filtrate obtained in step (b) to form $(A_n)^{m+}[M_y(H_2O)_{(p \cdot y)}X_2W_{22}O_{74}(OH)_2]^{m-}$ or a solvate thereof, and (d) optionally recovering the polyoxometalate obtained in step (a), step (b) or step (c), wherein
w is the negative charge of the POM-precursor $[X_2W_{22}O_{74}(OH)_2]^{w-}$ and is 12 for X=$Sb^{III}$, $Bi^{III}$, $As^{III}$, and 10 for X=$Se^{IV}$, $Te^{IV}$, and A, n, m, M, y, p and X are the same as defined above.

The process of the present invention can further comprise an oxidation step increasing the oxidation state of one or more transition metals M. Preferably, polyoxometalates according to the invention wherein the oxidation state of M is (II) are converted into polyoxometalates wherein the oxidation state of M is (IV), and more preferably into POMs wherein the oxidation state of each M is (IV). Accordingly, in this oxidation step a polyanion $[M_y(H_2O)_{3y}X_2W_{22}O_{74}(OH)_2]^{m-}$ can be reacted to a polyanion $[M_y(H_2O)_{5y}X_2W_{22}O_{74}(OH)_2]^{(m-2y)-}$ (where M, m, y, and X are as described above). Generally, the oxidation step can be carried out prior to or after step (d). Preferably, the oxidation is performed in the presence of air and sunlight. However, bubbling air or pure oxygen through the reaction mixture before, during or after the reaction is an alternative or complementary procedure. Furthermore, any other oxidant such as $H_2O_2$, organic peroxides (e.g. t-$(C_4H_9)$OOH) or peracids (e.g. $CH_3COOOH$) may also be useful to oxidize one or more transition metals M. Moreover, the oxidation can be performed by an electrochemical route, e.g. a potentiometric oxidation.

In step (a) of the present process a source of M is used. Generally, $Pd^{2+}$ salts such as $PdCl_2$, $PdBr_2$, $PdI_2$, $Pd(CH_3COO)_2$, $PdSO_4$, $Pt^{2+}$ salts such as $PtCl_2$, $PtBr_2$, $PtI_2$, $Pd^{4+}$ salts such as $PdF_4$, $K_2PdF_6$ and $Pt^{4+}$ salts such as $PtCl_4$, $K_2PtCl_6$, $Pt(NH_3)_2Cl_4$ can be used as a palladium and platinum source. Preferably, the Pd source is $PdCl_2$ and the Pt source is $PtCl_2$.

This transition metal source is reacted with (i) a salt of $[X_2W_{22}O_{74}(OH)_2]^{w-}$, (ii) a salt of $(XW_9O_{33})^{y-}$ and a salt of $WO_4^{2-}$ or (iii) an X containing starting material, such as $X_2O_3$ or $H_2XO_3$ (e.g. $Sb_2O_3$, $Bi_2O_3$, $H_2SeO_3$) or a salt of $X^{3+}$ or $X^{4+}$, and a salt of $WO_4^{2-}$ to give the transition metal substituted polyanion $[M_y(H_2O)_{(p \cdot y)}X_2W_{22}O_{74}(OH)_2]^{m-}$ (where w, y, and X are as described above). It is preferred to react the transition metal source, preferably $PdCl_2$, with (i) a salt of $[X_2W_{22}O_{74}(OH)_2]^{w-}$ (where w and X are as described above) and in particular this reaction is performed in an aqueous solution. Preferably, $Bi^{III}$ is used as X. Moreover, it is preferred that p is 3.

It has been found that the course of the reaction of step (a) can be controlled by various parameters such as pH of the solution, reaction temperature, concentration of the starting materials, ionic strength and counterions used.

In a preferred embodiment, the pH of the aqueous solution used in step (a) ranges from 4.5 to 6.5 and preferably from 4.8 to 6.0. Most preferably, a pH of about 4.8 is used. Generally, a buffer solution can be used for adjusting the pH. It is particularly preferred to use a sodium acetate buffer having a concentration of 0.5 M and a pH of about 4.8 as aqueous solvent. In another embodiment, the concentration of the aqueous solution (preferably a sodium acetate buffer solution) is from 0.1 to 2 M, preferably 0.25 to 1.5 M, preferably from 0.5 to 1.0 M, preferably about 0.5 M).

Furthermore, it is preferred to perform step (a) at a reaction temperature of 50 to 100° C., preferably 60 to 100° C., preferably 70 to 90° C. Moreover, the reaction mixture is preferably heated for about 1 to 120 minutes, preferably 30 to about 60 min, more preferably for about 30 min.

In addition, the concentration of the starting materials is considered to have an effect on the reaction of step (a). Preferably, the concentration of the Pd or Pt ions originating from the transition metal source ranges from 7.3 to 14.6 mmol/L, preferably 7.3 to 10.95 mmol/L, whereas the concentration of the salt of $[X_2W_{22}O_{74}(OH)_2]^{w-}$ (where X and w are as described above) preferably ranges from 3.2 to 4.0 mmol/L, preferably 3.5 to 4.0 mmol/L. Most preferably, concentrations of about 8.5 mmol/L (Pd or Pt ions) and about 3.7 mmol/L (POM precursor) are used in step (a).

Suitable salts of the polyanion $[X_2W_{22}O_{74}(OH)_2]^{w-}$ (where X and w are as described above) used in step (a) are lithium, sodium, potassium, ammonium and guanidinium. Preferably, the sodium salt of $[X_2W_{22}O_{74}(OH)_2]^{w-}$ (where X and w are as described above) is used.

Moreover, in step (a) it is preferred that the salt of $[X_2W_{22}O_{74}(OH)_2]^{w-}$ (where X and w are as described above) is added to an aqueous solution of the transition metal source. It is particularly preferred that this addition is performed quickly, preferably in under one minute.

Optionally, in step (b) the heated reaction mixture of step (a) is cooled, preferably to room temperature, and optionally filtered.

Furthermore, in step (c) a salt of the cation A can be added to the reaction mixture or, in case of filtration of this mixture in step (b), to its filtrate to form $(A_n)^{m+}[M_y(H_2O)_{(p \cdot y)}$ $X_2W_{22}O_{74}(OH)_2]^{m-}$ (where A, n, M, y, p, m, and X and w are as described above). Preferably, the salt of A is added as a solid or in the form of an aqueous solution. The counterions of A can be selected from the group consisting of any stable, non-reducing, water soluble anion, e.g. halides, nitrate, sulfate, acetate. Preferably, the chloride salt is used. However, the addition of extra cations A in step (c) is not necessary if the desired cations are already present during step (a), for example as a counterion of $[X_2W_{22}O_{74}(OH)_2]^{w-}$ (where X and w are as described above) or a component of the transition metal source including palladium and platinum themselves.

In step (d), the polyoxometalates according to the invention formed in step (a), (b) or (c) can be recovered. For example, isolation of the POMs can be effected by common techniques including bulk precipitation or crystallization.

The invention is also directed to the use of polyoxometalates according to the invention for catalyzing homogeneous and heterogeneous oxidation reactions of organic substrates. In particular, the present POMs can be used for oxidizing unsubstituted and substituted hydrocarbons such as branched or unbranched alkanes and alkenes having carbon numbers from C1 to C20, preferably from C1 to C6, cycloalkanes, cycloalkenes, aromatic hydrocarbons or mixtures thereof. Examples of suitable organic substrates are methane, ethane, propane, butane, isobutane, pentane, isopentane, neopentane, hexane, ethylene, propylene, a-butylene, cis-p-butylene, trans-β-butylene, isobutylene, n-pentylene, isopentylene, cyclohexane, adamantane, cyclooctadiene, benzene, toluene, o-xylene, m-xylene, p-xylene, mesitylene, durene, hexamethylbenzene, naphthalene, anthracene, phenantrene and mixtures thereof. Since the palladium or platinum ions are not sterically shielded by the polyanion backbone and their water ligands are substitution labile, the coordination sites of palladium and platinum, respectively are easily accessible to the organic substrate and the oxygen transfer molecule and therefore high catalytic activities are achieved. Further, the remarkable thermal stability of the polyoxoxmetalates permits their use under a great variety of reaction conditions.

Prior to their use in oxidation reactions, the present polyoxometalates can be supported on a solid support. Suitable supports include materials having a high surface area and a pore size which is sufficient to allow the polyoxometalates to be loaded, e.g. aerogels of aluminum oxide and magnesium oxide, titanium oxide, zirconium oxide, silica, mesoporous silica, active carbon, zeolites and mesoporous zeolites. In another embodiment, the supported polyoxometalates are further calcined at a temperature not exceeding the transformation temperature of the polyoxometalate, i.e. the temperature at which decomposition of the polyoxometalate starts to take place (usually about 500 to 600° C. for the present POMs).

The supported POMs according to the invention typically have POM loading levels on the support of up to 40 wt. % or even more. Accordingly, POM loading levels on the support of 1 to 40 wt. %, particularly 5 to 30 wt. %, and more particularly 5 to 20 wt. % are in general suitable. POM loading levels can be determined by Inductively Coupled Plasma Mass Spectrometry (ICP) analysis or X-ray photoelectron spectroscopy (XPS). In the event the values from the ICP and XPS differ, the ICP shall control. ICP analysis is performed using a Varian Vista MPX. The samples are prepared using microwave digestion by dissolving 10 mg of the supported POM in a mixture of $HNO_3$ (6 ml), HCl (6 ml), HF (1 ml) and $H_2O_2$ (3 ml). After the first run, 6 ml of boric acid (5%) is added and a second run is performed. The quantification is done by ICP-OES using calibration curves made between 0 and 50 ppm from standards with known amounts of the respective elements. All tests are conducted twice using a 20 mg sample in the second test. The final volume for each sample is 100 ml. XRD analysis is conducted using a Siemens Diffractometer D5000 with Cu Kα (λ=0.15406 nm, 40 kV, 40 mA) radiation, at a scanning speed of 0.06 deg/min. $N_2$ adsorption-desorption isotherms at 77 K are performed with a Quantachrome Autosorb1-C system, the data are analyzed by employing the BJH (Barrett-Joyner-Halenda) method. Pore volume and pore size distribution curves are obtained from the desorption branch of the isotherm. High Resolution TEM (HRTEM) images are obtained with a JEOL 200CX electron microscope operating at 200 kV.

Due to the definite stoichiometry of polyoxometalates, the present POMs can be converted (e.g. by calcination at a temperature exceeding the transformation temperature) to mixed metal oxide catalysts in a highly reproducible manner. Consequently, the polyoxometalates according to the invention can also be used as a precursor for mixed metal oxide catalysts such as so-called Mitsubishi-type catalysts which are particularly useful for the oxidation of hydrocarbons such as propane.

This invention also relates to:

1. Polyoxometalate represented by the formula $$(A_n)^{m+}[M_y(H_2O)_{(p \cdot y)}X_2W_{22}O_{74}(OH)_2]^{m-}$$

or solvates or mixtures thereof, wherein
A represents a cation,
n is the number of the cations,
m is the charge of the polyoxoanion,
M represents a transition metal selected from Pd, Pt and mixtures thereof,
y is 1, 2, 3 or 4,
p is the number of water molecules bound to one M and varies from 3 to 5, and
X represents a heteroatom selected from $Sb^{III}$, $Bi^{III}$, $As^{III}$, $Se^{IV}$ and $Te^{IV}$.

2. Polyoxometalate according to paragraph 1, wherein p is 3.
3. Polyoxometalate according to paragraph 1, wherein p is 5.
4. Polyoxometalate according to any one of paragraphs 1 to 3, wherein A is selected from the group consisting of lithium, sodium, potassium, rubidium, cesium, magnesium, calcium, strontium, barium, titanium, vanadium, chromium, lanthanum, lanthanide metal, actinide metal, manganese, iron, cobalt, nickel, copper, zinc, ruthenium, palladium, platinum, tin, antimony, tellurium, phosphonium, ammonium, guanidinium, tetraalkylammonium, protonated aliphatic amines, protonated aromatic amines or combinations thereof.
5. Polyoxymetalate according to any one of paragraphs 1 to 4, wherein the average y value ranges from 2 to 3 and preferably is 3.
6. Polyoxometalate according to paragraph 2, represented by the formula

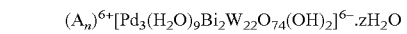

wherein z represents the number of attracted water molecules per polyoxometalate molecule, exclusive of water molecules which are bound as ligands to palladium.

7. Process for the preparation of a polyoxometalate according to any one of paragraphs 1 to 5 comprising
(a) reacting an aqueous solution of a source of M with
(i) a salt of $[X_2W_{22}O_{74}(OH)_2]^{w-}$
(ii) a salt of $(XW_9O_{33})^{y-}$ and a salt of $WO_4^{2-}$ or
(iii) an X containing starting material and a salt of $WO_4^{2-}$
to form a salt of $[M_y(H_2O)_{(p \cdot y)}X_2W_{22}O_{74}(OH)_2]^{m-}$, (b) optionally cooling and filtering the reaction mixture of step (a), (c) optionally adding a salt of A to the reaction mixture of step (a) or the filtrate obtained in step (b) to form $(A_n)^{m+}[M_y(H_2O)_{(p-y)}X_2W_{22}O_{74}(OH)_2]^{m-}$ or a solvate thereof, and (d) optionally recovering the polyoxometalate obtained in step (a), step (b) or step (c), wherein w is the negative charge of the POM-precursor $[X_2W_{22}O_{74}(OH)_2]^{w-}$ and is 12 for $X=Sb^{III}$, $Bi^{III}$, $As^{III}$ and 10 for $X=Se^{IV}$, $Te^{IV}$, and A, n, m, M, y, p and X are the same as defined in paragraphs 1 to 6.

8. Process according to paragraph 7, further comprising an oxidation step increasing the oxidation state of one or more transition metals M.

9. Process according to paragraph 7 or 8, wherein the source of M is selected from the group consisting of $PdCl_2$, $PdBr_2$, $PdI_2$, $Pd(CH_3COO)_2$, $PdSO_4$, $PtCl_2$, $PtBr_2$, $PtI_2$, $PdF_4$, $K_2PdF_6$, $PtCl_4$, $K_2PtCl_6$ and $Pt(NH_3)_2Cl_4$, and preferably is $PdCl_2$.

10. Process according to any one of paragraphs 7 to 9, wherein the pH of the aqueous solution used in step (a) ranges from 4.5 to 6.5, preferably from 4.8 to 6.0.

11. Process according to any one of paragraphs 7 to 10, wherein in step (a) a sodium acetate buffer having a concentration of 0.1 to 2.0 M, preferably 0.5 M is used as aqueous solvent.

12. Process according to any one of paragraphs 7 to 11, wherein step (a) is performed at a temperature of 50 to 100° C., preferably from 70 to 90° C.

13. Process according to any one of paragraphs 7 to 12, wherein in step (a) the concentration of the transition metal ions originating from the source of M ranges from 7.3 to 10.95 mmol/L and the concentration of the salt of $[X_2W_{22}O_{74}(OH)_2]^{w-}$ ranges from 3.5 to 4.0 mmol/L.

14. Process according to any one of paragraphs 7 to 13, wherein in step (a) the sodium salt of $[X_2W_{22}O_{74}(OH)_2]^{w-}$ is used, wherein X represents a heteroatom selected from $Sb^{III}$, $Bi^{III}$, $As^{III}$, $Se^{IV}$ and $Te^{IV}$ and w is 10 or 12.

15. Process according to any one of paragraphs 7 to 14, wherein in step (d) the product is isolated by bulk precipitation or crystallization.

16. Use of a polyoxometalate according to any one of paragraphs 1 to 6 or prepared according to any one of paragraphs 7 to 15 as catalyst for the homogeneous or heterogeneous oxidation of organic substrates.

17. Use according to paragraph 16, wherein the organic substrates are unsubstituted or substituted hydrocarbons such as branched or unbranched alkanes and alkenes having carbon numbers from C1 to C20, cycloalkanes, cycloalkenes, aromatic hydrocarbons or mixtures thereof.

18. Use according to paragraph 16 or 17, wherein the polyoxometalate is supported on a solid support.

19. Use according to paragraph 18, wherein the supported polyoxometalate is calcined at a temperature not exceeding the transformation temperature of the polyoxometalate.

20. Use of a polyoxometalate according to any one of paragraphs 1 to 6 or prepared according to any one of paragraphs 7 to 15 as a precursor for preparing mixed metal oxide catalysts.

21. Use according to paragraph 20, wherein the mixed metal oxide catalysts are Mitsubishi-type catalysts.

The invention is further illustrated by the following example.

EXAMPLE 1

Synthesis of $Na_3Pd_{1.5}[Pd_3(H_2O)_9Bi_2W_{22}O_{74}(OH)_2] \cdot 22H_2O$ 0.030 g (0.17 mmol) of $PdCl_2$ was dissolved in 20 mL of 0.5 M NaAc buffer (pH 4.8) while stirring. Then 0.5 g (0.073 mmol) of $Na_{12}[Bi_2W_{22}O_{74}(OH)_2]$ was quickly added. The solution was heated to 80° C. for about 30 min and filtered after it had cooled. Then 0.5 mL of 1.0 M $NH_4Cl$ solution was added to the brown filtrate. Slow evaporation at room temperature led to 0.10 g (yield 39%) of a brown crystalline product within a few days.

IR (cm−1): 945, 888 (sh), 862 (sh), 832, 792, 739, 644, 607, 534, 469, 430, 408 (measured on a Nicolet-Avatar 370 spectrometer using KBr pellets).

Besides IR the product was also characterized by single crystal XRD. The crystal data and structure refinement obtained on a Bruker Kappa APEX II instrument using the SHELXTL software package are shown in the following table.

TABLE 1

Crystal data and structure refinement for $Na_3Pd_{1.5}[Pd_3(H_2O)_9Bi_2W_{22}O_{74}(OH)_2] \cdot 22H_2O$.

| | |
|---|---|
| Empirical formula | Bi2 H64 Na3 O107 Pd4.5 W22 |
| Formula weight | 6787.11 |
| Temperature | 173(2) K |
| Wavelength | 0.71073 Å |
| Crystal system | Triclinic |
| Space group | P-1 |
| Unit cell dimensions | a = 12.8207(12) Å α = 108.610(7)° |
| | b = 13.1305(14) Å β = 98.928(7)° |
| | c = 17.407(2) Å γ = 109.550(6)° |
| Volume | 2501.9(5) Å$^3$ |
| Z | 1 |
| Density (calculated) | 4.322 Mg/m$^3$ |
| Absorption coefficient | 29.531 mm$^{-1}$ |
| F(000) | 2787 |
| Crystal size | 0.131 × 0.094 × 0.028 mm$^3$ |
| Theta range for data collection | 2.67 to 28.80°. |
| Index ranges | −17 <= h <= 17, −17 <= k <= 17, −23 <= l <= 23 |
| Reflections collected | 105715 |
| Independent reflections | 12947 [R(int) = 0.1127] |
| Completeness to theta = 28.80° | 99.1% |
| Absorption correction | Multiscan |
| Max. and min. transmission | 1.000 and 0.3628 |
| Refinement method | Full-matrix least-squares on F$^2$ |
| Data/restraints/parameters | 12947/0/325 |
| Goodness-of-fit on F$^2$ | 1.054 |
| Final R indices [I > 2sigma(I)] | R1 = 0.0563, wR2 = 0.1551 |
| R indices (all data) | R1 = 0.0887, wR2 = 0.1791 |
| Largest diff. peak and hole | 7.737 and −3.598 e · Å$^{-3}$ |

The atomic coordinates as well as the equivalent isotropic displacement parameters which are defined as one third of the trace of the orthogonalized U$^{ij}$ tensor are shown in Table 2.

TABLE 2

Atomic coordinates x, y and z ($\cdot 10^4$ Å) and equivalent isotropic displacement parameters U(eq) ($\cdot 10^3$ Å$^2$) for Na$_3$Pd$_{1.5}$[Pd$_3$(H$_2$O)$_9$Bi$_2$W$_{22}$O$_{74}$(OH)$_2$]•22H$_2$O.

| | x | y | z | U(eq) |
|---|---|---|---|---|
| W(1) | 6778(1) | 11448(1) | 4058(1) | 22(1) |
| W(2) | 4912(1) | 11951(1) | 2912(1) | 23(1) |
| W(3) | 4087(1) | 9386(1) | 3068(1) | 21(1) |
| W(4) | 7871(1) | 12979(1) | 2712(1) | 22(1) |
| W(5) | 8908(1) | 11053(1) | 1820(1) | 22(1) |
| W(6) | 7104(1) | 7869(1) | 1001(1) | 19(1) |
| W(7) | 5894(1) | 8210(1) | −829(1) | 22(1) |
| W(8) | 7904(1) | 9288(1) | 3056(1) | 21(1) |
| W(9) | 5215(1) | 7253(1) | 2054(1) | 20(1) |
| W(10) | 2387(1) | 6968(1) | 1082(1) | 25(1) |
| W(11) | 7034(1) | 11576(1) | 614(1) | 18(1) |
| Bi(1) | 5477(1) | 9679(1) | 1450(1) | 16(1) |
| Pd(1) | 365(2) | 7989(2) | 420(2) | 22(1) |
| Pd(2) | 2167(2) | 5024(2) | −988(1) | 25(1) |
| Pd(3) | 7234(2) | 8456(2) | 5423(2) | 27(1) |
| Pd(4) | 3611(9) | 5318(9) | −1854(7) | 29(2) |
| O(1T) | 7529(12) | 12173(11) | 5123(9) | 27(3) |
| O(1PD) | 1998(12) | 5638(12) | 170(9) | 30(3) |
| O(1BI) | 5526(10) | 10522(10) | 2736(8) | 18(2) |
| O(2A) | 4320(11) | 11176(10) | 1717(8) | 20(3) |
| O(2T) | 4387(13) | 13011(12) | 3122(10) | 32(3) |
| O(2BI) | 7136(10) | 11109(10) | 1729(8) | 17(2) |
| O(2PD) | 3876(16) | 5558(16) | −487(12) | 52(4) |
| O(3T) | 3022(12) | 8783(12) | 3491(10) | 31(3) |
| O(3BI) | 6432(10) | 8862(10) | 1973(8) | 16(2) |
| O(4T) | 8635(13) | 14436(12) | 3381(10) | 31(3) |
| O(5T) | 10316(12) | 11236(12) | 1909(9) | 27(3) |
| O(6T) | 7552(11) | 6961(11) | 285(8) | 22(3) |
| O(7T) | 5111(12) | 6719(12) | −1455(9) | 29(3) |
| O(7TA) | 7309(13) | 8391(12) | −846(10) | 33(3) |
| O(8T) | 8991(12) | 9347(12) | 3817(9) | 30(3) |
| O(9T) | 4527(13) | 5923(13) | 2128(10) | 34(3) |
| O(10A) | 2296(13) | 6395(13) | 1873(10) | 36(3) |
| O(11T) | 7325(11) | 12195(11) | −128(9) | 25(3) |
| O(1P1) | 1053(12) | 7228(12) | 971(9) | 30(3) |
| O(11A) | 5672(12) | 11589(11) | 679(9) | 27(3) |
| O(12) | 5914(11) | 12417(11) | 4004(8) | 22(3) |
| O(13) | 5350(11) | 10381(11) | 4114(8) | 21(3) |
| O(14) | 7764(11) | 12249(10) | 3566(8) | 21(3) |
| O(18) | 7240(11) | 10178(11) | 3760(8) | 23(3) |
| O(2P1) | −590(20) | 6430(20) | −521(19) | 100(9) |
| O(23) | 3771(11) | 10798(11) | 3118(9) | 24(3) |
| O(24) | 6381(11) | 12814(11) | 2714(9) | 25(3) |
| O(3P1) | 1639(19) | 9661(19) | 1372(15) | 68(6) |
| O(3P2) | 460(20) | 4530(20) | −1495(16) | 78(7) |
| O(39) | 4771(11) | 8289(11) | 2887(8) | 21(3) |
| O(4P1) | −320(20) | 8870(20) | 28(19) | 97(8) |
| O(4P2) | 2260(20) | 4280(20) | −2182(17) | 81(7) |
| O(45) | 9206(11) | 12557(10) | 2663(8) | 20(3) |
| O(56) | 8128(12) | 9446(12) | 1134(9) | 28(3) |
| O(58) | 8688(11) | 10512(11) | 2752(8) | 21(3) |
| O(67) | 5938(11) | 8011(11) | 243(9) | 23(3) |
| O(68) | 8130(10) | 8237(10) | 2060(8) | 16(2) |
| O(69) | 5958(11) | 6702(11) | 1203(9) | 23(3) |
| O(89) | 6666(11) | 7854(11) | 2942(8) | 22(3) |
| O(310) | 3330(11) | 8720(11) | 1885(8) | 22(3) |
| O(411) | 7813(11) | 13119(11) | 1690(9) | 24(3) |
| O(511) | 8623(11) | 11541(10) | 948(8) | 20(3) |
| O(711) | 6489(10) | 10024(10) | −26(8) | 19(3) |
| O(910) | 4109(11) | 7239(11) | 1199(8) | 22(3) |
| O(2P3) | 8310(20) | 10100(20) | 5549(15) | 72(6) |
| O(1P3) | 6160(30) | 6760(30) | 5220(20) | 127(11) |
| O(3P3) | 5795(19) | 8485(18) | 4623(14) | 65(6) |
| O(4P3) | 8620(30) | 8610(30) | 6390(30) | 148(14) |
| Na(1) | 4504(17) | 4554(16) | 2680(13) | 42(4) |
| O(1W) | 7440(20) | 6320(20) | −1864(16) | 77(6) |

The structure of the polyanion is also illustrated in FIG. 1 which shows that two trilacunary Keggin fragments B-β-[BiW$_9$O$_{33}$]$^{9-}$ are linked by two {WO$_2$}$^{2+}$ units (the two middle WO$_6$ octahedra) and two {WO$_2$(OH)}$^+$ groups (the two outer WO$_6$ octahedra). The latter are bound to sterically accessible, square planar palladium ions (dark circles) each having three terminal water ligands (small circles).

All documents described herein are incorporated by reference herein, including any priority documents and/or testing procedures, except to the extent they are inconsistent with this specification. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

The invention claimed is:

1. A polyoxometalate represented by the formula

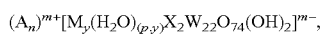

wherein
A represents a cation,
n is the number of the cations,
m is the charge of the polyoxoanion,
M represents a transition metal selected from Pd, Pt and mixtures thereof,
y is 1, 2, 3 or 4,
p is the number of water molecules bound to one M and varies from 3 to 5, and
X represents a heteroatom selected from Sb$^{III}$, Bi$^{III}$, As$^{III}$, Se$^{IV}$ and Te$^{IV}$.

2. The polyoxometalate of claim 1, wherein p is 3.

3. The polyoxometalate of claim 1, wherein p is 5.

4. The polyoxometalate of claim 1, wherein A is selected from the group consisting of lithium, sodium, potassium, rubidium, cesium, magnesium, calcium, strontium, barium, titanium, vanadium, chromium, lanthanum, lanthanide metal, actinide metal, manganese, iron, cobalt, nickel, copper, zinc, ruthenium, palladium, platinum, tin, antimony, tellurium, phosphonium, ammonium, guanidinium, tetraalkylammonium, protonated aliphatic amines, protonated aromatic amines or combinations thereof.

5. The polyoxometalate of claim 1, wherein the average y value ranges from 2 to 3.

6. The polyoxometalate of claim 2, wherein the polyoxometalate is represented by the formula

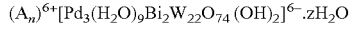

wherein z represents the number of attracted water molecules per polyoxometalate molecule, exclusive of water molecules which are bound as ligands to palladium, and where A represents a cation and n is the number of the cations.

7. A process for the preparation of a polyoxometalate represented by the formula:

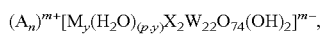

wherein
A represents a cation,
n is the number of the cations,
m is the charge of the polyoxoanion,
M represents a transition metal selected from Pd, Pt and mixtures thereof,
y is 1, 2, 3 or 4,
p is the number of water molecules bound to one M and varies from 3 to 5, and
x represents a heteroatom selected from Sb$^{III}$, Bi$^{III}$, As$^{III}$, Se$^{IV}$ and Te$^{IV}$,
said process comprising
(a) reacting an aqueous solution of a source of M with
(i) a salt of [X$_2$W$_{22}$O$_{74}$(OH)$_2$]$^{w-}$,
(ii) a salt of (XW$_9$O$_{33}$)$^{y-}$ and a salt of WO$_4$$^{2-}$ or (iii) an X containing starting material and a salt of $WO_4^{2-}$
to form a salt of $[M_y(H_2O)_{(p,y)}X_2W_{22}O_{74}(OH)_2]^{m-}$, (b) optionally cooling and filtering the reaction mixture of step (a), (c) optionally adding a salt of A to the reaction mixture of step (a) or the filtrate obtained in step (b) to form $(A_n)^{m+}[M_y(H_2O)_{(p,y)}X_2W_{22}O_{74}(OH)_2]^{m-}$ or a solvate thereof, and (d) optionally recovering the polyoxometalate obtained in step (a), step (b) or step (c), wherein w is 12 for $X=Sb^{III}$, $Bi^{III}$, $As^{III}$, and 10 for $X=Se^{IV}$, $Te^{IV}$.

8. The process of claim 7, further comprising an oxidation step increasing the oxidation state of one or more transition metals M.

9. The process of claim 7, wherein the source of M is selected from the group consisting of $PdCl_2$, $PdBr_2$, $PdI_2$, $Pd(CH_3COO)_2$, $PdSO_4$, $PtCl_2$, $PtBr_2$, $PtI_2$, $PdF_4$, $K_2PdF_6$, $PtCl_4$, $K_2PtCl_6$ and $Pt(NH_3)_2Cl_4$.

10. The process of claim 7, wherein the pH of the aqueous solution used in step (a) ranges from 4.5 to 6.5.

11. The process of claim 7, wherein in step (a) a sodium acetate buffer having a concentration of 0.5 M is used as aqueous solvent.

12. The process of claim 7, wherein step (a) is performed at a temperature of 50 to 100° C.

13. The process of claim 7, wherein in step (a) the concentration of the transition metal ions originating from the source of M ranges from 7.3 to 10.95 mmol/L and the concentration of the salt of $[X_2W_{22}O_{74}(OH)_2]^{W-}$ ranges from 3.5 to 4.0 mmol/L.

14. The process of claim 7, wherein in step (a) the sodium salt of $[X_2W_{22}O_{74}(OH)_2]^{W-}$ is used.

15. The process of claim 7, wherein in step (d) the product is isolated by bulk precipitation or crystallization.

16. The polyoxometalate of claim 1, wherein the polyoxometalate is supported on a solid support.

17. The polyoxometalate of claim 16, wherein the supported polyoxometalate is calcined at a temperature not exceeding the transformation temperature of the polyoxometalate.

18. The polyoxometalate of claim 2, wherein the polyoxometalate is supported on a solid support.

19. The polyoxometalate of claim 18, wherein the supported polyoxometalate is calcined at a temperature not exceeding the transformation temperature of the polyoxometalate.

20. A process to oxidize organic substrates comprising contacting an organic substrate selected from the group consisting of branched or unbranched alkanes and alkenes having carbon numbers from C1 to C20, cycloalkanes, cycloalkenes, aromatic hydrocarbons or mixtures thereof with one or more polyoxometalates of claim 1.

21. The process of claim 20, wherein the organic substrates is a selected from the group consisting of branched or unbranched alkanes and alkenes having carbon numbers from C1 to C20.

22. The process of claim 20 wherein the organic substrate is an alkane.

23. The process of claim 20 wherein the polyoxometalate is supported on a solid support.

24. The process of claim 20 wherein the supported polyoxometalate is calcined at a temperature not exceeding the transformation temperature of the polyoxometalate.

* * * * *